March 5, 1963 D. E. JACKSON 3,080,272
FUSED HOMOGENEOUS WATERLEAF OF ORGANIC POLYMER
FIBRIDS AND INORGANIC FLAKES, AND
PROCESS FOR PREPARING SAME
Filed March 12, 1959
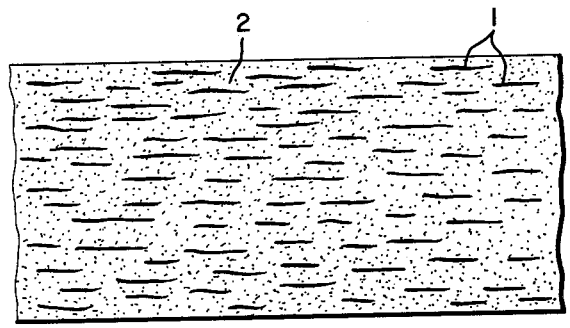
INVENTOR
DALE E. JACKSON
BY
ATTORNEY

United States Patent Office 3,080,272
Patented Mar. 5, 1963

3,080,272
FUSED HOMOGENEOUS WATERLEAF OF ORGANIC POLYMER FIBRIDS AND INORGANIC FLAKES, AND PROCESS FOR PREPARING SAME
Dale E. Jackson, Prairie Village, Kans., assignor to E. I. du Pont de Nemours and Company, Wilmington, Del., a corporation of Delaware
Filed Mar. 12, 1959, Ser. No. 798,798
13 Claims. (Cl. 162—157)

The present invention relates to novel and useful shaped structures and to a process for preparing such structures. More particularly, it relates to plastic structures containing flake-like particles and a process for their preparation.

The preparation of sheets, slabs, or molded objects of synthetic resins containing nominal amounts of flake-like fillers such as glass or mica is difficult by conventional techniques used in the plastics industry. At higher levels of the fillers, about 40% and greater, such methods as mixing the flake-like filler and a polymeric molding powder for extrusion or pressing or by calendering becomes extremely difficult if not impossible due to the very high viscosity of the resulting mix or flake-like fillers and plastics and the difficulty of obtaining a homogeneous mixture. Also the use of Banbury mixers and such equipment causes severe attrition of the brittle particles by shear mixing so that structures containing large overlapping flakes cannot be made.

It is an object of the present invention to provide shaped structures of synthetic polymers containing flake-like materials. Another object is to provide a waterleaf structure of a synthetic polymer containing flake-like materials homogeneously distributed throughout the waterleaf. A further object is to provide a fused shaped structure of a synthetic polymer containing flake-like materials. A still further object is to provide an inexpensive process for the preparation of such structures wherein the flake-like materials are as large as ½ inch across. Other objects will become apparent as the description of the invention proceeds.

These objects are accomplished by the present invention which provides a sheet-like structure which comprises a homogeneous waterleaf of fibrids and flake-like material, the ratio of the said fibrids to flake-like material being from about 4/1 to about 3/7.

The drawing is an edge view of a portion of one embodiment of the invention, showing flake-like material 1 distributed throughout a continuous phase of fibrids 2.

The process of preparing such sheet-like structures comprises forming a homogeneous suspension of fibrids and flake-like material in an inert medium (such as a liquid or foam) with the ratio of the said fibrids to flake-like material being from about 4/1 to about 3/7, and thereafter depositing the fibrids and flake-like material on a papermaker's screen in the form of a homogeneous waterleaf.

In a preferred embodiment of the present invention the above process is carried out using water as the inert medium and the fibrids in the resulting waterleaf structures are fused until the fibrids lose their identity and form a continuous phase. One of the products of the present invention is the fused structure resulting from this process.

The term "sheet-like structure" is used to mean a product which has two dimensions which are relatively large as compared to the third dimension. It includes thin sheets as well as the thicker products which resemble wallboard and the like.

The term "homogeneous waterleaf" is used to signify a sheet-like product which is deposited from a suspension onto a papermaker's screen and does not vary substantially in composition from one section of the structure to the other.

The term "fibrid" is employed herein to designate a nonrigid, wholly synthetic polymeric particle capable of forming paper-like structures on a papermaking machine. Fibrids, their characteristics and preparation are disclosed in United States Application Serial No. 635,876, filed January 23, 1957, by Morgan, now abandoned, and the continuation-in-part filed January 22, 1959, as United States application Serial No. 788,371 now U.S. Patent No. 2,999,788. Thus to be designated a "fibrid," a particle must possess (a) an ability to form a waterleaf having a couched wet tenacity of at least about 0.002 gram per denier when a plurality of the said particles is deposited from a liquid suspension upon a screen, which waterleaf, when dried at a temperature below about 50° C., has a dry tenacity at least equal to its couched wet tenacity and (b) an ability, when a plurality of the said particles is deposited concomitantly with staple fibers from a liquid suspension upon a screen, to bond a substantial weight of the said fibers by physical entwinement of the said particles with the said fibers to give a composite waterleaf with a wet tenacity of at least about 0.002 gram per denier. In addition, fibrid particles have a Canadian freeness number between 90 and 790 and a high absorptive capacity for water, retaining at least 2.0 grams of water per gram of particle under a compression load of about 39 grams per square centimeter.

Any normally solid wholly synthetic polymeric material may be employed in the production of fibrids. By "normally solid" is meant that the material is non-fluid under normal room conditions. By ". . . an ability to . . . bond a substantial weight of . . . (staple) fibers . . . " is meant that at least 50% by weight of staple based on total staple and fibrids can be bonded from a concomitantly deposited mixture of staple and fibrids.

It is believed that the fibrid characteristics recited above are a result of the combination of the morphology and nonrigid properties of the particle. The morphology is such that the particle is nongranular and has at least one dimension of minor magnitude relative to its largest dimension, i.e., the fibrid particle is fiber-like or film-like. Usually, in any mass of fibrids, the individual fibrid particles are not identical in shape and may include both fiber-like and film-like structures. The nonrigid characteristic of the fibrid, which renders it extremely "supple" in liquid suspension and which permits the physical entwinement described above, is presumably due to the presence of the "minor" dimension. Expressing this dimension in terms of denier, as determined in accordance with the fiber coarseness test described in Tappi 41, 175A–7A, No. 6 (June) 1958, fibrids have a denier no greater than about 15.

Complete dimensions and ranges of dimensions of such heterogeneous and odd-shaped structures are difficult to express. Even screening classifications are not always completely satisfactory to define limitations upon size since at times the individual particles become entangled with one another or wrap around the wire meshes of the screen and thereby fail to pass through the screen. Such behavior is encountered particularly in the case of fibrids made from soft (i.e., initial modulus below 0.9 g.p.d.) polymers. As a general rule however, fibrid particles, when classified according to the Clark Classification Test (Tappi 33, 294–8, No. 6 (June) 1950) are retained to the extent of not over 10% on a 10-mesh screen, and retained to the extent of at least 90% on a 200-mesh screen.

Fibrid particles are usually frazzled, have a high specific surface area, and as indicated, a high absorptive capacity for water. A typical fibrid particle is described in the aforementioned United States applications and in Belgian Patent 564,206, granted July 23, 1958. The polymers, in some cases, are advantageously, slightly modified before conversion into fibrids, they may be dyed, pigmented, plasticized and the like. These modified products have obvious advantages over the unmodified products.

The preferred fibrids are those the water-leaves of which when dried for a period of 12 hours at a temperature below the stick temperature of the polymer from which they are made (i.e., the minimum temperature at which a sample of the polymer leaves a wet, molten trail as it is stroked with moderate pressure across a smooth surface of a heated block) have a tenacity of at least about 0.005 gram per denier. Relative to denier, those fibrids with a denier no greater than about 7 are generally preferred. For "hard" fibrids (i.e., those prepared from polymers having an initial modulus of at least 0.9 gram per denier), deniers no greater than 4 and preferably no greater than 3 are particularly useful whereas with "soft" fibrids (i.e., those prepared from polymers having an initial modulus less than 0.9 gram per denier) it is preferred that the denier be greater than about 4.

By the expression "flake-like material" is meant a solid material in the form of flakes, plates, lamella or the like which have a maximum dimension that is at least 50 times as great as the minimum dimension (the smallest thickness if uneven) of the material and which maximum dimension is less than about 0.5 inch. The amount of the flake-like material which is employed in the practice of the present invention is such that the ratio of fibrids to flake-like material is from about 4/1 to about 3/7. Thus, when only fibrids are employed with the flake-like material, the flake constitutes from about 20 to about 70% by weight of the dried sheet. When materials such as dyes, pigments and the like are also employed in the process, the percentage will change somewhat but the ratio of the fibrids to flake-like materials should still be between about 4/1 to about 3/7.

The expression "homogeneous suspension . . . inert medium" signifies that the fibrids and flake-like material are substantially individually dispersed in the medium so that the liquid composition is constant throughout. The "medium" which may be used in the process to form suspensions is any liquid which is inert to the materials in the suspension or a foam as discussed in copending United States Application Serial No. 726,186, filed April 3, 1958, by Wilcox now U.S. Patent No. 3,007,840. While the preferred liquid is water and the product deposited on the screen is referred to as a "waterleaf," it is to be understood that the invention is not limited to water and that the term waterleaf is used only in a descriptive manner to signify that it is deposited from a suspension.

The term "papermaker's screen" is used in its conventional sense to mean a screen such as that found in a papermaker's sheet mold or on a papermaking machine such as a Fourdrinier machine. The mesh of the screen employed is generally from about 100 to about 200 mesh but may be varied as desired providing that it retains most of the fibrids and flake-like material from the suspension.

The expression "fusing the said fibrids until the fibrids lose their identity and form a continuous phase" is used to signify that the fibrid particles are coalesced or fused together so that they no longer remain as individual particles but form a composite polymer mass which extends throughout the structure. The particles are preferably fused by hot pressing the resulting sheet although in some instances heating the sheet alone will serve to accomplish the same result. In any event, the fibrids "flow" together and form a continuous phase. It should be noted that in many instances the "flow temperature" of the fibrids is well below the melting temperature of the polymer and it is thus possible to "fuse" the fibrids without the necessity of heating them to their melting point. Preferably, the sheets are dried before fusing.

The fusing step may be carried out on the waterleaf sheet itself to form sheets or panels, or alternately, the flexible waterleaf may be shaped around an article or cut into pieces (for molding) before fusing. The fused structures have a tensile strength of at least 1000 p.s.i., generally 2000 p.s.i. or more. Structures with a dielectric strength of at least 1100 volts/mil of thickness can also be made.

The following examples are given to illustrate the invention and are not intended to limit it in any manner. All parts are given in parts by weight unless otherwise expressed.

EXAMPLE I

A copolymer containing 20% by weight of caproamide units and 80% by weight of hexamethylene sebacamide units is dissolved in formic acid to produce a 10% solution. The solution (40 grams) is added to approximately 300 ml. of glycerol at room temperature in a one-quart Waring Blendor operating at approximately 14,000 r.p.m. The resulting fibrids are washed with water on a filter and then pressed to produce a filter press cake (18.4% solids). One hundred and fifty grams of the press cake are slurried with water in an "Osterizer" mixer (made by John Oster Manufacturing Company) and placed on an 8" x 8" 100-mesh screen in a hand-sheet box. To the slurry in the sheet mold is added flakes of glass about 5 microns thick and having a maximum size of ¼ inch ("Flakeglas E" made by Owens-Corning Fiberglas Corporation) equal to the weight of the dry fibrids (28 grams) and 20 ml. of a 20% aqueous solution of sodium hexametaphosphate to help the dispersion of the glass flake. The mixture of fibrids and glass flake is stirred together in the mold, vacuum applied and a hand sheet made. The sheet is washed between screens, removed from the screen, blotted and dried at 70° C. in a circulating air oven. The dried sheets are cut to shape and 4 plys molded at 210° C. under 240 p.s.i. pressure to form impact bars, tensile-test bars and 8" x 8" panels approximately 112 mils thick. The physical properties for the pressed sheet A are given in the table below.

The above procedure is repeated with the replacement of the flake glass with fine (about 100 mesh) muscovite mica. The physical properties of the pressed sheet B are given in the table below.

A control plate is formed from the fibrids alone (which fuse at 208° C.) using the same procedure as above. The physical properties of the pressed sheet C are given in the table below.

| Sheet | Tensile Strength in p.s.i. $\times 10^{-3}$ | Tensile Modulus, p.s.i. $\times 10^{-5}$ | Izod Impact, ft. lbs./in./notch |
|---|---|---|---|
| A | 4.19 | 55.0 | 0.54 |
| B | 6.60 | 8.9 | 0.55 |
| C | 9.40 | 3.9 | 0.51 |

The significant gain in the tensile modulus using flake-like materials in general, and glass flake in particular, is quite obvious.

EXAMPLE II

A copolyester of poly(ethylene terephthalate/isophthalate), 80/20% by weight, is made by the ester exchange condensation polymerization of dimethylterephthalate, dimethylisophthalate, and ethylene glycol. The polymer has a relative viscosity of 39.1 and a crystalline melting point of 175° C. The polymer is dissolved in dimethylformamide at 120 to 130° C. to give a 20% solution which is slowly added from an insulated pipette into a mixture of dimethylformamide/water 192.5/97.5 by weight at 10° C. contained in and stirred by an "Osterizer" mixer with mixing blades. Four different batches of fibrids prepared in this manner are washed and slurried in a sheet mold along with "Flakeglas E" and 20 ml. of 20% aqueous sodium hexametaphosphate to form a waterleaf as in Example I. The dried sheets are cut to the shape desired and 4 plys molded at 195° C. at 340 p.s.i. for one minute. The physical properties of the pressed sheet A are given in the table below.

The above procedure is repeated with the replacement of the flake glass with fine (about 100 mesh) muscovite mica. The physical properties of the pressed sheet B are given in the table below.

The above procedure is again repeated using the fibrids alone as a control. The physical properties of the pressed sheet C are given in the table below.

| Sheet | Tensile Strength in p.s.i. ×10⁻³ | Tensile Modulus. p.s.i.×10⁻⁵ | Izod Impact, ft. lbs./in./notch |
|---|---|---|---|
| A | 7.10 | 32.0 | 0.53 |
| B | 6.00 | 15.0 | 0.25 |
| C | 9.80 | 3.4 | 0.43 |

EXAMPLE III

Fibrids of poly(methyl methacrylate) are made by slowly adding a 30% solution of the polymer containing a red dye in acetone into a mixture of 500 ml. of glycerine and 100 ml. of water contained in and stirred by an "Osterizer" mixer using a mixing agitator. The fibrids are washed with water, slurried with flake glass (fibrid to flake glass ratio 1/1) and hand sheets made and dried. The dried hand sheet is plied and pressed to give plates as in Example I. The physical properties of the pressed sheet A are given in the table below.

The above procedure is repeated using a 50/50 mixture of flake glass and ¼" length fibers of poly(ethylene terephthalate) 4 d.p.f. (0.44 tex units) for the flake glass employed above. The physical properties of the pressed sheet B are given in the table below.

The above procedure is again repeated using the fibrids alone (polymer stick temperature of 150° C.) as a control. The physical properties of the pressed sheet C are given in the table below.

| Sheet | Tensile Strength in p.s.i. ×10⁻³ | Tensile Modulus. p.s.i.×10⁻⁵ | Izod Impact, ft. lbs./in./notch |
|---|---|---|---|
| A | 4.70 | 32.1 | 0.4 |
| B | 7.70 | 15.0 | 3.9 |
| C | 8.3 | 4.3 | 0.2 |

The plates containing the glass flakes had a novel decorative appearance with light being reflected from the glass flakes within the plastic structure.

EXAMPLE IV

Polyvinyl chloride in the form of a commercial molding powder ("Geon 103 EB," made by the Goodrich Chemical Company) with a polymer stick temperature of about 130° C. is dissolved in methyl ethyl ketone to produce a solution containing 10% by weight of the polymer. With the stirrer operating at 12,300 revolutions per minute, 30 grams of this solution are poured in a thin even stream into a one-quart Waring Blendor can containing about 400 ml. of glycerine over a period of 2 minutes. The fibrids so produced are filtered from the mixture of liquids, washed, and dispersed in water. The fibrids are then made into hand sheets containing 50% (i.e., fibrid to glass ratio is 1/1) flake glass (Sheet A), 50% mica (Sheet B) and no additive whatsoever (Sheet C) as in Example I. The hand sheets are dried, plied together and pressed to make molded structures as in Example I. The physical properties of the resulting sheets are given in the table below.

| Sheet | Tensile Strength in p.s.i. ×10⁻³ | Tensile Modulus, p.s.i.×10⁻⁵ | Izod Impact, ft. lbs./in./notch |
|---|---|---|---|
| A | 2.4 | 17.8 | 0.67 |
| B | 3.0 | 8.5 | 0.47 |
| C | 7.7 | 5.6 | 0.53 |

EXAMPLE V

A 10% solution is prepared by adding 30 grams of a copolymer of acrylonitrile and styrene 30/70% by weight to 270 grams of N,N-dimethyl formamide in a one-half liter container and then stirring the mixture at 27° C. for ¾ hours. The solution is poured in a thin even stream into 50% aqueous dimethylformamide that is being stirred at high power in a Waring Blendor. The fibrids so produced are thoroughly washed with water and the wet-filter cake then slurried with flake glass as in Example I (fibrid to glass ratio 1/1). Hand sheets are made, dried, and fused as in Example I. The physical properties of the pressed sheet A are given in the table below.

The above procedure is repeated using mica rather than flake glass in the sheet as in Example I. The physical properties of the pressed sheet B are given in the table below.

A similar sheet is made using only the above fibrids to form a control sheet. The physical properties of the pressed sheet C are given in the table below.

| Sheet | Tensile Strength in p.s.i. ×10⁻³ | Tensile Modulus, p.s.i.×10⁻⁵ | Izod Impact, ft. lbs./in./notch |
|---|---|---|---|
| A | 4.7 | 39.3 | 0.63 |
| B | 4.7 | 16.0 | 0.29 |
| C | 7.7 | 6.5 | 0.24 |

EXAMPLE VI

A solution consisting of 7 grams of an epoxide resin ("Epon 1009," made by the Shell Chemical Corporation, having the recurring structural unit

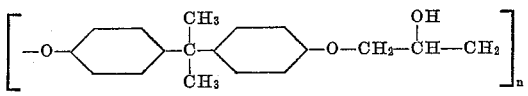

and a melting point of 145 to 155° C.), 0.1075 grams of methylene dianiline (as a curing agent for the epoxide resin) and 14 grams of tetrahydrofuran are prepared and poured as an even stream into 400 ml. of a 0.25% aqueous solution of carboxymethyl cellulose at 12° C. that is stirred in a Waring Blendor being operated at 70 volts. The fibrid slurry so produced is added to 6 liters of water followed by 3.0 grams of 16—20 mesh mica (½" plates number 6, ruby third quality loose mica splittings by J. A. Telcholz, Subsidiary of the Paramount Corporation, which are slurried with water in a Waring Blendor at 30–40 volts to give 16–20 mesh mica particles). The slurry of fibrids and mica are stirred 5 minutes with a "Vibro Mixer" operated at 110 volts and then added to a hand mold and the waterleaf washed with about 8 liters of water. This sheet is dried in an oven at 90° C. for 30 minutes. The dried sheet is then pressed at 175° C. for 60 minutes under 500 p.s.i. pressure.

In a similar manner, pressed sheets are made containing 50%, 60%, 70% and 0% of mica. All of the sheets are pressed at 500 p.s.i. except that containing only fibrids which is pressed at 390 p.s.i. The sheets are all uniform appearing, have a high tensile modulus and are easy to handle. All of the pressed sheets have tensile strengths of 2000 p.s.i. or greater. The dielectric strength of these sheets (dried) is measured at 22° C. between ½" diameter electrodes (ASTMD 149-55T method) with a maximum voltage of 50,000. The results are shown in the following table:

| Flake-Like Material | Size Mesh | Percent of Flake-Like Material | Properties of Pressed Structure | |
|---|---|---|---|---|
| | | | Thickness Average, mils | Dielectric Strength, Volts/mil |
| Mica | 28/32 | 50 | 8.85 | 1,480±72 |
| Mica | 100/150 | 50 | 8.01 | 1,648±350 |
| Mica | 16/20 | 60 | 9.31 | 1,515±90 |
| Mica | 16/20 | 70 | 8.30 | 1,660±63 |
| None | | 0 | 19.1 | 1,052 |

When the epoxy resin fibrids are replaced by the fibrids of Examples I to IV, fused sheets with similar high dielectric strengths are obtained.

Fibrids can be formed from any soluble, synthetic, preferably fiber-forming polymer as well as any condensation polymer which can be formed by interfacial spinning. It is convenient in considering such polymers to classify them as "hard" and "soft" polymers.

*"Hard" Polymers*

Suitable hard polymers include acrylonitrile polymers and copolymers, such as those formed by acrylonitrile with methyl acrylate or vinyl chloride; polyacrylic and polymethacrylic esters, such as poly(methyl methacrylate); poly(vinylchloride) and copolymers of vinyl chloride with vinyl esters, acrylonitrile, vinylidene chloride, and the like; vinylidene chloride polymers; polyhydrocarbons, such as polystyrene and polyethylene; chlorosulfonated polyethylene; polychlorotrifluoroethylene; poly(vinyl alcohol); partially hydrolyzed poly(vinyl esters); polyamides, such as poly(hexamethylene adipamide), poly-ethylene sebacamide), poly(methylene bis[p-cyclohexylene]adipamide), polycaprolactam, and copolyamides, such as those formed from a mixture of hexamethylenediamine, adipic acid, and sebacic acid, or by a mixture of caprolactam, hexamethylenediamine, and adipic acid; polyurethanes; polyureas; polyesters, such as poly(ethylene terephthalate); polyphenyl esters, such as polycarbonates; polythiolesters; polysulfonamides; polysulfones, such as the one prepared from propylene and $SO_2$; polyoxymethylene; and many others. Copolymers of all types may be used. Derivatives of the polymers, such as the halogenated polyhydrocarbons, are also suitable. Fibrids can be prepared from polymers which are tacky at room temperature, such as poly(vinyl acetate), by chilling the solution and precipitant below the temperature at which the polymer becomes tacky.

In addition to the above, all manner of thermosetting resins can be used to make the fibrids of this invention. They of course should be solid at the temperatures of fibridation and must be soluble if made by the shear precipitation process. In many instances it is advantageous to include a polymerization catalyst in the fibrid to facilitate the final curing.

Epoxide resins are of great utility here. Such resins have an ether oxygen atom linked to 2 vicinal carbon atoms and can be made by the reaction of an epihalohydrin with a polyhydric phenol and/or a polyhydric alcohol such as ethylene glycol, propylene glycol, and the like.

Phenolic resins, such as phenol-formaldehyde resitoles of all types and partially polymerized polyester resins, in particular the alkyd type, may be used.

Partially polymerized products from addition type monomers with a functionality greater than 2 either alone or as comonomers such as acrylic or methacrylic esters of a polyhydric alcohol (e.g., glycol methacrylate), divinyl sulfide, vinyl allyl ketone, allyl methacrylate, divinyl ether, and divinyl acetylene may be used in this invention.

*"Soft" Polymers*

Representatives of "soft" polymers are the plasticized vinyl polymers and the condensation elastomers. The plasticized vinyl polymers are prepared by mixing any suitable plasticizer with a compatible vinyl polymer. The ester type of plasticizer has been found to be quite satisfactory. Plasticized vinyl chloride polymers, including copolymers with vinyl acetate and vinylidene chloride, have been found to be particularly suitable. Fibrids may be made from certain uncured elastomers by the methods applicable to the tacky hard polymers. The properties may then be modified by suitable curing procedures.

A wide variety of low modulus condensation elastomers are available for preparing fibrids. A condensation elastomer will usually form shaped articles having a tensile recovery above about 75% and a stress decay below about 35%.

Segmented condensation elastomers are prepared by starting with a low molecular weight polymer (i.e., one having a molecular weight in the range from about 700 to about 3500), preferably a difunctional polymer with terminal groups containing active hydrogen, and reacting it with a small coreactive molecule under conditions such that a new difunctional intermediate is obtained with terminal groups capable of reacting with active hydrogen. These intermediates are then coupled or chain-extended by reacting with compounds containing active hydrogen. Numerous patents have been issued in which the low molecular weight starting polymer is a polyester or polyesteramide and the coreactive small molecule is a diisocyanate. A large variety of coreactive active hydrogen compounds is suggested in these patents for preparing the segmented condensation elastomers. Among the most practical chain-extending agents are water, diamines, and dibasic acids.

United States Patent 2,692,873 describes similar products in which the starting polyesters have been replaced by polyethers of a corresponding molecular weight range. More recent developments have shown that a number of suitable macromolecular compounds, such as polyhydrocarbons, polyamides, polyurethanes, etc., with suitable molecular weights, melting point characteristics, and terminal groups, can serve as the starting point for preparing segmented elastomers of this type. It has also been found possible to replace the diisocyanate with other difunctional compounds, such as diacid halides, which are capable of reacting with active hydrogen. In addition, elastic copolyetheresters are obtained by condensation of a polyether glycol, an aliphatic glycol, and an aromatic dibasic acid or suitable derivative.

Other types of condensation elastomers are also suitable. United States Patent 2,670,267 describes N-alkyl-substituted copolyamides which are highly elastic and have a suitable low modulus. A copolyamide of this type, obtained by reacting sebacic acid with a mixture of hexamethylenediamine, N-isobutylhexamethylenediamine, and N,N'-isobutylhexamethylenediamine produces an elastomer which is particularly satisfactory for the purposes of this invention. United States Patent 2,623,033 describes linear elastic copolyesters prepared by reacting glycols with a mixture of aromatic and acyclic dicarboxylic acids. Copolymers prepared from ethylene glycol, terephthalic acid, and sebacic acid have been found to be particularly useful. Another class of condensation elastomers is described in United States Patent 2,430,860. The elastic polyamides of this patent are produced by reacting polycarbonamides with formaldehyde.

Suitable inorganic, rigid, flake-like materials may be found in the colored or uncolored, mixed or unmixed classes of mica comprising phlogophite, lepidolite or muscovite, vitreous substances such as fusible rocks, slag, glasses of all types and similar materials. Other inorganic materials such as metals or the like may also be used as the flake-like material.

The flake-like material may also be cut or chopped films of organic polymers. Such films should be insoluble in the dispersing medium of the process and must retain their shape at the temperature used in fusing the fibrids. High melting polymers such as polyethylene terephthalate may be used with an appropriate fibrid. Infusible polymers such as regenerated cellulose (e.g. cellophane films), cross-linked epoxide or phenol-formaldehyde resins and the like may be used with any fibrid. The use of colored films offers unusual decorative products.

The products of this invention are of great advantage in all types of plastic application for their decorative appeal, high modulus of elasticity and excellent electrical properties. The waterleaf, sheet-like structures of the present invention may be used as insulating materials, insulating sheets for condensers and molding mats. However, their great advantage in the flexible form is that they can be wrapped around uneven surfaces and molded in situ to give substantially permanent insulation. The fused or consolidated structures may be used as panels for building or decoration, electrical insulating sheets, electrical insulating pieces when molded to other shapes, ash trays, lamp shades, table tops and the like.

The process provides a simple, economical way of making uniform structures with the added advantage that relatively large flake-like materials (as large as ½" diameter) can be incorporated in the structure. The use of such large platelets offers novel decorative effects and improved electrical properties over the use of finely ground platelets.

Many other equivalent modifications will be apparent to those skilled in the art from a reading of the above without a departure from the inventive concept.

What is claimed is:

1. A sheet-like structure which comprises a fused homogeneous waterleaf of synthetic organic polymer fibrids and inorganic flake-like material wherein the fibrids form a continuous phase about overlapping flake-like material, the maximum dimension of the flake-like material being up to about 0.5 inch and at least about 50 times the minimum dimension, and the ratio of the said fibrids to flake-like material being from about 4/1 to about 3/7.

2. The product of claim 1 wherein the flake-like material is glass.

3. The product of claim 1 wherein the flake-like material is mica.

4. The product of claim 1 wherein the fibrids are fibrids of a polyamide.

5. The product of claim 1 wherein the fibrids are fibrids of a polyester.

6. The product of claim 1 wherein the fibrids are fibrids of an addition polymer.

7. A process of preparing a sheet-like structure which comprises forming a homogeneous suspension of fusible fibrids and inorganic flake-like material, the said flake-like material having a maximum dimension at least 50 times the minimum dimension and the said maximum dimension being about 0.5 inch, in an inert medium with the ratio of the said fibrids to flake-like material being from about 4/1 to about 3/7, depositing the fibrids and flake-like material on a foraminous surface to form a homogeneous waterleaf and thereafter fusing the said fibrids to form a continuous phase.

8. The process of claim 7 wherein the inert medium is water.

9. The process of claim 7 wherein the flake-like material is glass.

10. The process of claim 7 wherein the flake-like material is mica.

11. The process of claim 7 wherein the fibrids are fibrids of a polyamide.

12. The process of claim 7 wherein the fibrids are fibrids of a polyester.

13. The process of claim 7 wherein the fibrids are fibrids of an addition polymer.

References Cited in the file of this patent

UNITED STATES PATENTS

| | | |
|---|---|---|
| 322,034 | Beck | July 14, 1885 |
| 1,881,419 | Munroe | Oct. 4, 1932 |
| 1,978,923 | Wiener | Oct. 30, 1934 |
| 2,328,198 | Davenport | Aug. 31, 1943 |
| 2,342,387 | Catlin | Feb. 22, 1944 |
| 2,400,544 | Kline | May 21, 1946 |
| 2,810,646 | Wooding et al. | Oct. 22, 1957 |
| 2,901,390 | Conklin | Aug. 25, 1959 |

FOREIGN PATENTS

| | | |
|---|---|---|
| 454,000 | Canada | Jan. 11, 1949 |
| 572,962 | Great Britain | Oct. 31, 1945 |
| 781,512 | Great Britain | Aug. 21, 1957 |

OTHER REFERENCES

Basler: (Alien Property Custodian), Ser. No. 291,499, May 4, 1943.